US011981076B2

(12) United States Patent
Mottin (10) Patent No.: US 11,981,076 B2
(45) Date of Patent: May 14, 2024

(54) ADDITIVE MANUFACTURING MACHINE COMPRISING A MOVABLE SURFACE FOR RECEIVING POWDER OPTIMIZED TO RETAIN THE GRAINS OF POWDER

(71) Applicant: AddUp, Cebazat (FR)

(72) Inventor: Jean-Baptiste Mottin, Cebazat (FR)

(73) Assignee: ADDUP, Cebazat (FR)

( * ) Notice: Subject to any disclaimer, the term of this patent is extended or adjusted under 35 U.S.C. 154(b) by 33 days.

(21) Appl. No.: 17/602,450

(22) PCT Filed: Apr. 6, 2020

(86) PCT No.: PCT/EP2020/059752
§ 371 (c)(1),
(2) Date: Oct. 8, 2021

(87) PCT Pub. No.: WO2020/207967
PCT Pub. Date: Oct. 15, 2020

(65) Prior Publication Data
US 2022/0212399 A1  Jul. 7, 2022

(30) Foreign Application Priority Data
Apr. 8, 2019 (FR) ........................................ 1903718

(51) Int. Cl.
*B29C 64/205* (2017.01)
*B22F 10/28* (2021.01)
(Continued)

(52) U.S. Cl.
CPC ............ *B29C 64/205* (2017.08); *B22F 10/28* (2021.01); *B22F 12/50* (2021.01); *B29C 64/153* (2017.08);
(Continued)

(58) Field of Classification Search
CPC ... B29C 64/205; B29C 64/153; B29C 64/245; B29C 64/236; B29C 64/268; B22F 12/50;
(Continued)

(56) References Cited

U.S. PATENT DOCUMENTS 9,914,292 B2 *  3/2018  Yakubov ............... B29C 64/255
10,967,568 B2     4/2021  Walrand
(Continued)

FOREIGN PATENT DOCUMENTS

WO   2010/095987 A1   8/2010
WO   2017/108868 A1   6/2017

OTHER PUBLICATIONS

International Search Report dated Jun. 5, 2020, in corresponding PCT/EP2020/059752 (4 pages).

*Primary Examiner* — Alison L Hindenlang
*Assistant Examiner* — Erica Hartsell Funk
(74) *Attorney, Agent, or Firm* — VENABLE LLP (57) ABSTRACT

A machine for additive manufacturing comprises a work top, a work area, a device for depositing a layer of powder onto the work area and a heat or energy source used to selectively consolidate a layer of powder, the device comprising a movable element for receiving powder moving relative to the work top and in the vicinity of the work area, a device for dispensing a bead of powder onto the movable element and a device for spreading the bead of powder. The movable element assuming the form of a translationally movable slide or the movable element rotationally moving around the work area, at least part of the upper surface of a movable element is located above the upper surface of the work top and/or at least part of the upper surface of a movable element is located below the upper surface of the work top.

5 Claims, 8 Drawing Sheets (51) Int. Cl.
*B22F 12/50* (2021.01)
*B29C 64/153* (2017.01)
*B29C 64/236* (2017.01)
*B29C 64/245* (2017.01)
*B29C 64/268* (2017.01)
*B22F 12/60* (2021.01)
*B33Y 10/00* (2015.01)
*B33Y 30/00* (2015.01)

(52) U.S. Cl.
CPC .......... *B29C 64/236* (2017.08); *B29C 64/245* (2017.08); *B29C 64/268* (2017.08); *B22F 12/60* (2021.01); *B33Y 10/00* (2014.12); *B33Y 30/00* (2014.12)

(58) Field of Classification Search
CPC .......... B22F 10/28; B22F 12/60; B33Y 10/00; B33Y 30/00
See application file for complete search history.

(56) References Cited

U.S. PATENT DOCUMENTS

| | | |
|---|---|---|
| 2011/0293770 A1 | 12/2011 | Ackelid et al. |
| 2013/0186514 A1 | 7/2013 | Zhuang et al. |
| 2014/0065194 A1* | 3/2014 | Yoo ...................... B29C 64/106 425/375 |
| 2017/0036238 A1 | 2/2017 | Zhuang et al. |
| 2019/0001560 A1* | 1/2019 | Walrand ............... B23K 26/342 |

* cited by examiner

ADDITIVE MANUFACTURING MACHINE COMPRISING A MOVABLE SURFACE FOR RECEIVING POWDER OPTIMIZED TO RETAIN THE GRAINS OF POWDER

BACKGROUND

The invention falls within the field of powder-based additive manufacturing by melting grains of this powder with the assistance of one or more energy or heat source(s), such as a laser beam and/or an electron beam and/or diodes.

More specifically, the invention falls within the field of additive manufacturing by powder bed deposition and it relates to layering the additive manufacturing powder inside a machine for additive manufacturing by powder bed deposition.

Even more specifically, the aim of the invention is to reduce the amount of powder used to produce each layer of powder and to improve the quality of the powder bed.

Application WO 2017/108868 describes a machine for additive manufacturing by powder bed deposition comprising a work top and at least one work area where layers of powder are spread and selectively successively consolidated one after another.

The machine described in application WO 2017/108868 comprises a device for depositing a layer of powder onto the work area and a heat or energy source used to selectively consolidate a layer of powder deposited onto the work area. The deposition device comprises a slide for receiving powder moving in the vicinity of the work area, a device for dispensing a bead of powder onto the slide and a device for spreading the bead of powder from the slide towards the work area.

In order to guarantee the quality of the manufactured parts, the powder must uniformly cover the entire work area or at least the parts of the work area in which parts are manufactured. To this end, excessive powder is deposited onto the slide and the excess powder that is not used to produce the layer of powder is pushed by the spreading device to a powder recovery tank.

Even if the excess powder recovered in the tank can be recycled, it is preferable that the amount of powder excessively deposited onto the slide and that must be recycled is limited. Indeed, it is always preferable to limit the powder consumption of the machine and to limit the amount of powder to be recycled since this recycling can be expensive.

Controlling the flow of the device for dispensing powder and controlling the movements of the slide allows the amount of powder forming the bead of powder that will be spread by the spreading device over the work area to be dosed in the best possible manner.

However, during any movements of the slide, the powder deposited onto the slide can be subject to vibrations and jarring, causing a certain amount of the grains of powder deposited onto the slide to fall off. Furthermore, the amount of excessive powder deposited onto the slide is generally increased in order to compensate for a certain amount of powder falling off during the movements of the slide.

In the case of additive manufacturing powders with high castability, the amount of excessive powder deposited onto the slide needs to be significantly increased in order to compensate for a greater amount of grains of powder falling off.

The aim of the present invention is to improve the retention of the grains of powder on a movable powder reception surface in an additive manufacturing machine, in particular for limiting and/or preventing a certain amount of grains of powder from falling off under the effect of vibrations or jarring experienced by the movable reception surface during the movements thereof.

SUMMARY

To this end, the aim of the invention is a machine for additive manufacturing by powder bed deposition, this machine comprising a work top, a work area, a device for depositing a layer of powder onto the work area and a heat or energy source used to selectively consolidate a layer of powder deposited onto the work area, the device for depositing a layer of powder comprising a movable element for receiving powder moving relative to the work top and in the vicinity of the work area, a device for dispensing a bead of powder onto the movable element and a device for spreading the bead of powder from the movable element towards the work area.

According to the invention, the movable element assumes the form of a slide mounted to translationally move in a transverse horizontal direction relative to the work area and moving between a retracted position, in which this slide is located outside the trajectory of the powder spreading device, and a deployed position, in which this slide at least partly extends into the trajectory of the powder spreading device or the movable element externally surrounding the work area over its entire circumference and rotationally moving around the work area, at least part of the upper surface of a movable element is located above the upper surface of the work top and/or at least part of the upper surface of a movable element is located below the upper surface of the work top.

The one or more part(s) of the upper surface of the movable element that is/are located above and/or below the upper surface of the work top allow the roughness and/or the relative contact surface between the grains of powder deposited onto the movable element and the upper surface of the movable element to be increased. The increase in the roughness and/or the relative contact surface allows the grains of powder to be retained on the upper surface of the movable element, in particular during movements of this movable element.

The invention also makes provision for the following:
the entire upper surface of a movable element is located below the upper surface of the work top;
the upper surface of a movable element is located between 60 micrometres and 5 millimetres, or between 100 micrometres and 1 millimetre, below the upper surface of the work top;
at least part of the upper surface of a movable element is located in the extension of the upper surface of the work top, this movable element also comprises at least one raised form rising above its upper surface and/or at least one recessed form extending below its upper surface;
a raised form is printed onto the upper surface of the movable element;
a recessed form is machined in the upper surface of the movable element;
a raised form or a recessed form is made up of a plurality of elementary patterns;
a single recessed form is provided in the upper surface of the movable element;
the single recessed form machined in the upper surface of the movable element assumes the form of a rectangular section recess in a vertical plane and assumes a height in a vertical direction ranging between 60 micrometres and 5 millimetres, or between 150 micrometres and 2 millimetres;

the single recessed form extends over a width at least equal to 80% of the width of the upper surface of the movable element;

the single recessed form extends lengthwise over a distance that is greater than the largest transverse dimension of the work area;

the movable element moves in the vicinity of the work area in a receptacle provided in the work top;

with the device for dispensing a bead of powder being fixed, a movable element moves under the dispensing device.

BRIEF DESCRIPTION OF THE DRAWINGS

Further features and advantages of the invention will become apparent in the following description. This description, which is provided by way of a non-limiting example, refers to the appended drawings, in which.

DETAILED DESCRIPTION

The invention relates to a machine for additive manufacturing by powder bed deposition. Additive manufacturing by powder bed deposition is an additive manufacturing method in which one or more part(s) is/are manufactured by the selective melting of various mutually superposed layers of additive manufacturing powder. The first layer of powder is deposited onto a support such as a platform, then selectively sintered or melted using one or more source(s) of energy or of heat along a first horizontal section of the one or more part(s) to be manufactured. Then, a second layer of powder is deposited onto the first layer of powder that has just been melted or sintered, and this second layer of powder is in turn selectively sintered or melted, and so on, until the last layer of powder is reached that is useful for manufacturing the last horizontal section of the part or part(s) to be manufactured.

Figure 1:
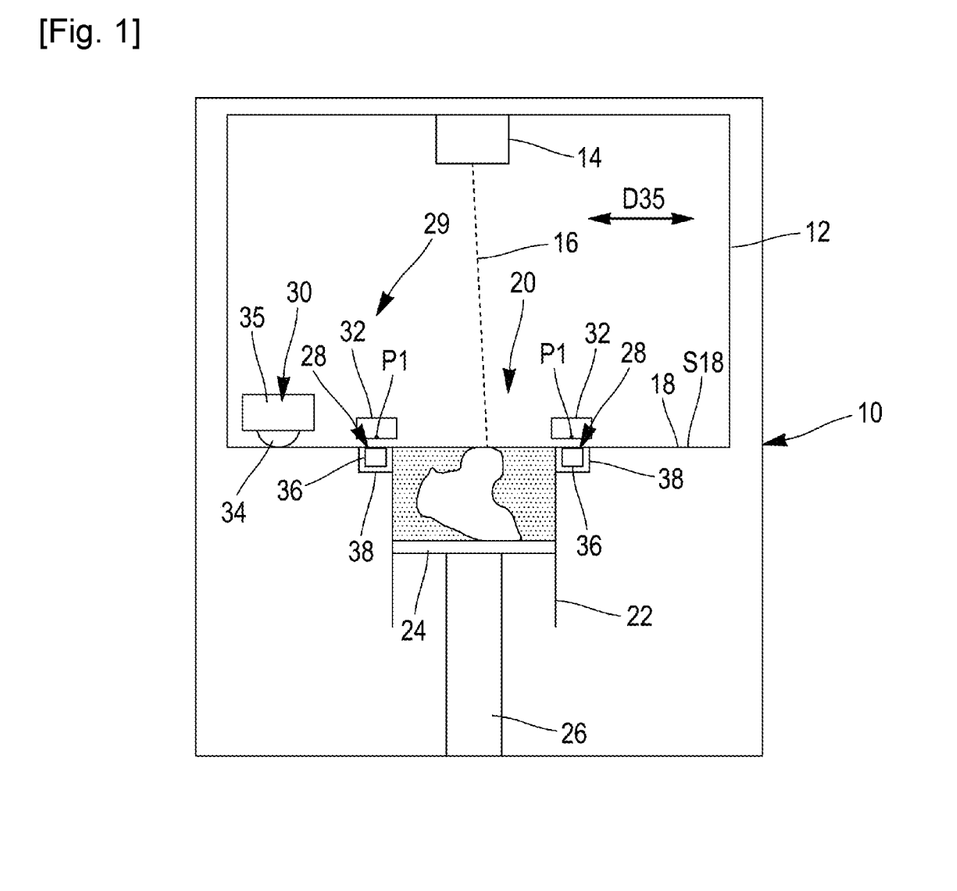
FIG. 1 is a schematic front view of a first variant of an additive manufacturing machine that can be improved with the invention.

As illustrated in FIG. 1, and in order to allow additive manufacturing of parts by powder bed deposition, the additive manufacturing machine 10 according to the invention comprises, for example, a manufacturing chamber 12 and at least one heat or energy source 14 used to selectively, via one or more beams 16, melt a layer of additive manufacturing powder deposited inside the manufacturing chamber 12.

The one or more heat or energy source(s) 14 can assume the form of sources capable of producing one or more electron beam(s) and/or one or more laser beam(s). These sources are, for example, one or more electron gun(s) and/or one or more laser source(s). The one or more source(s) 14 is/are, for example, fixed relative to the manufacturing chamber 12. In order to allow selective melting, and therefore allow the one or more beam(s) 16 of energy or of heat to move, each source 14 comprises means for moving and controlling the one or more beam(s) 16. Alternatively, the one or more heat or energy source(s) 14 can be movably mounted inside the manufacturing chamber 12, for example, when these sources are laser beam emitting diodes.

The manufacturing chamber 12 is a closed chamber. A wall of this manufacturing chamber 12 can comprise a glass pane for observing the manufacturing progress inside the chamber. At least one wall of this manufacturing chamber 12 comprises an opening granting access to the inside of the chamber for maintenance or cleaning operations, with this opening being able to be sealed closed again by a door during a manufacturing cycle. During a manufacturing cycle, the manufacturing chamber 12 can be filled with an inert gas, such as nitrogen, in order to prevent the additive manufacturing powder from oxidizing and/or in order to avoid risks of fire or of explosion. The manufacturing chamber 12 can be maintained at a slight overpressure in order to avoid the ingress of oxygen, or can be maintained under vacuum when an electron beam is used inside the chamber to sinter or melt the powder.

Figure 2:
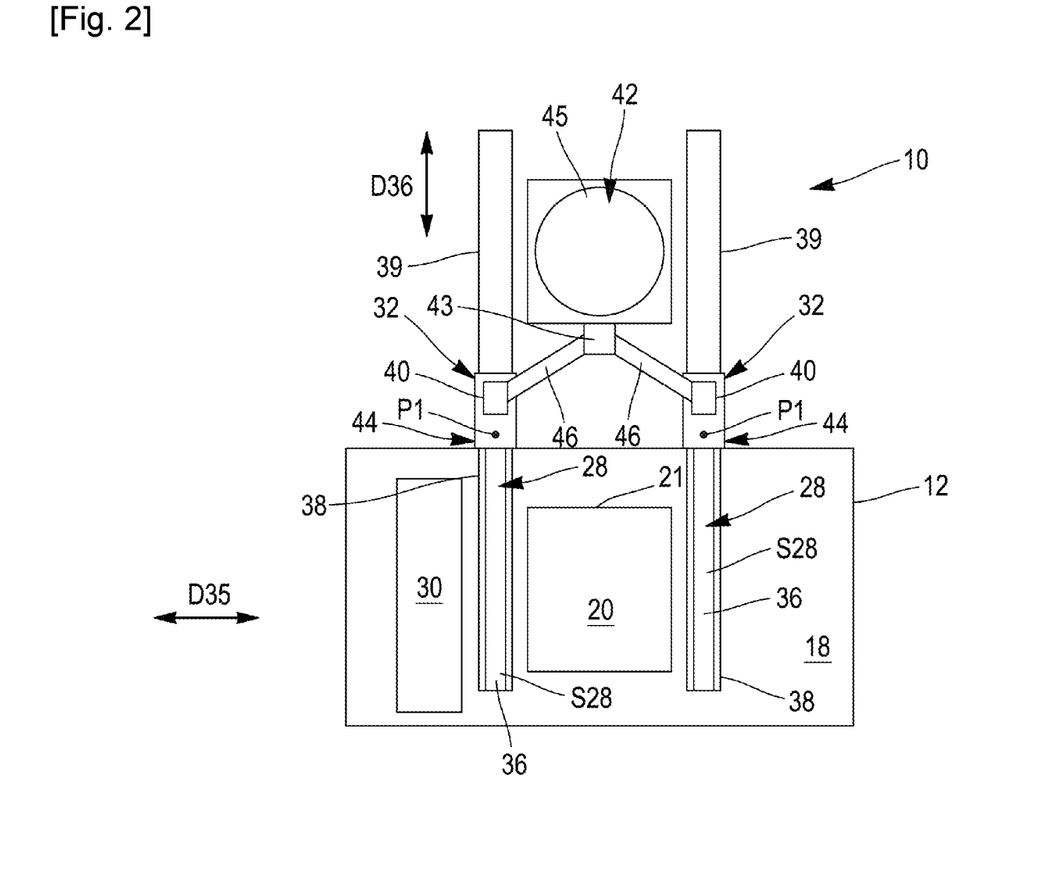
FIG. 2 is a schematic top view of a first variant of an additive manufacturing machine that can be improved with the invention.

Inside the manufacturing chamber 12, the additive manufacturing machine 10 according to the invention comprises, for example, a work area 20 and a device 29 for depositing a layer of powder onto the work area 20. With the machine comprising a horizontal work top 18 with an upper surface S18, the work area 20 is located, for example, in the work top 18. As illustrated in FIG. 2, a work area 20 is defined, for example, by an opening 21 provided in the horizontal work top 18 and by a manufacturing sleeve 22 and a manufacturing platform 24. The sleeve 22 extends vertically under the work top 18 and it opens into the work top 18 via the opening 21. The manufacturing platform 24 slides vertically inside the manufacturing sleeve 22 under the effect of an actuator 26 such as a ram.

In order to produce the various layers of powder used for the additive manufacturing of the one or more part(s) to be manufactured, the deposition device 29 comprises, for example, a movable element 28 for receiving powder moving relative to the work top and in the vicinity of the work area 20, a device 32 for dispensing a bead of powder onto the movable element and a device 30 for spreading the bead of powder from the movable element towards the work area.

A device 32 for dispensing a bead of powder is fixedly mounted, for example, relative to the manufacturing chamber 12 and to the work top 18.

The spreading device 30 assumes the form of a scraper and/or of one or more roller(s) 34 mounted on a carriage 35. This carriage 35 is mounted to translationally move in a longitudinal horizontal direction D35 above the work area 20. In order to be set into longitudinal, horizontal translation movement, the carriage 35 can be motorized, or set in motion by a motor (not shown) located outside the manufacturing chamber 12 and connected to the carriage via a movement-transmission system such as pulleys and a belt.

Figure 3:
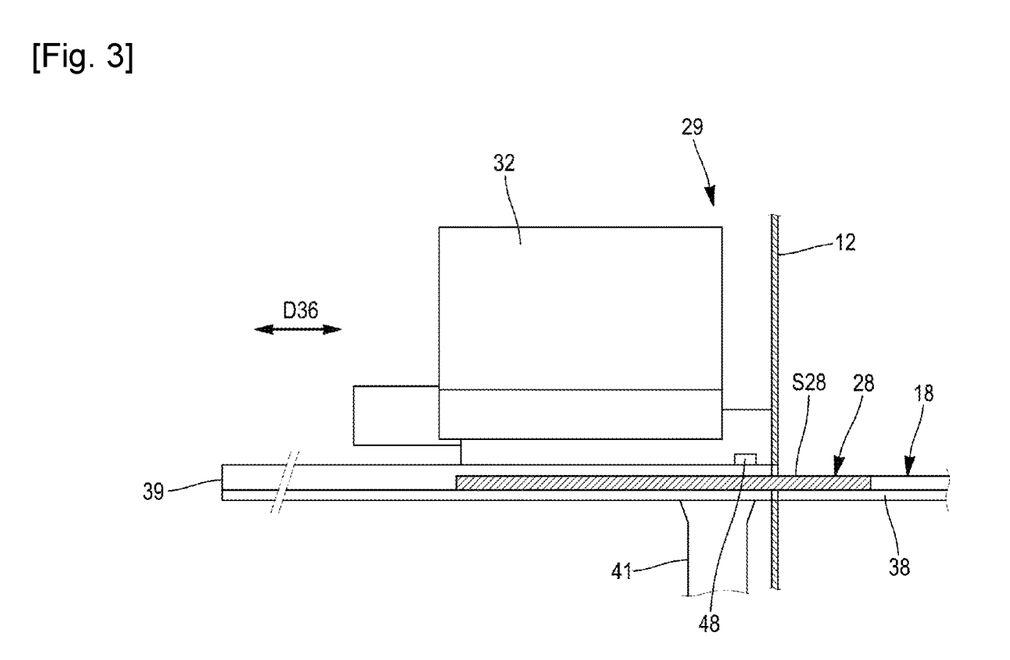
FIG. 3 is a schematic side view of a first variant of an additive manufacturing machine that can be improved with the invention.

In a first variant illustrated in FIGS. 1, 2 and 3, the additive manufacturing machine according to the invention can comprise two movable elements 28 for receiving powder and two devices 32 for dispensing a bead of powder, with each movable element receiving powder dispensed by at least one dispensing device. In greater detail, a movable element and a dispensing device are provided on each side of the work area 20 in the longitudinal horizontal direction D35 of movement of the carriage 35 of the spreading device 30. Thus, the powder spreading device does not make any needless journey over the work area, since it can spread powder in both directions of its longitudinal horizontal direction D35 of movement.

As shown in FIG. 2, a movable element 28 translationally moves in the vicinity of the work area. To this end, a movable element 28 assumes the form of a slide 36, for example. A slide 36 is mounted to translationally move in a transverse horizontal direction D36 in relation to the work area 20. A slide 36 moves between a retracted position, in which this slide is located outside the trajectory of the powder spreading device 30, and a deployed position, in which this slide at least partly extends into the trajectory of the powder spreading device 30. For example, the transverse horizontal direction D36 in which a slide 36 moves is perpendicular to the longitudinal horizontal direction D35 of movement of the carriage 35 of the spreading device 30. The slide 36 is translationally driven, for example, by an actuator, such as a ram (not shown).

A dispensing device 32 is provided above each slide 36, and therefore above each movable element 28. Each slide 36, and therefore each movable element 28, is of elongated shape in the transverse horizontal direction D36. Each slide 36, and therefore each movable element 28, moves under the powder dispensing device when the slide transitions from its retracted position to its deployed position.

As shown in FIGS. 2 and 3, each slide 36 is mounted to translationally move in a receptacle 38 provided in the work top 18 of the manufacturing chamber 12. Each slide 36 translationally moves in a horizontal plane. In its retracted position, the slide 36 is located, for example, in a sheath 39 sealably connected to the manufacturing chamber 12 and mounted opposite the receptacle 38, such as a groove, provided in the work top. When it is in the deployed position, a slide 36 is located in the receptacle 38. A receptacle 38 and the sheath 39 extend in the transverse horizontal direction D36 in which a slide 36 moves. Each receptacle 38 extends in the vicinity of a work area 20. Advantageously, a sheath 39 is equipped with a hopper 41 for recovering the grains of powder falling from the slide.

By being mounted to translationally move in the vicinity of a work area 20 and in the work top 18, each slide 36 occupies a very small amount of space in the vicinity of the work area 20.

With each movable element 28 assuming the form of a translationally movable slide, a work area 20 preferably assumes a rectangular form, for example. However, a work area 20 can also assume other forms better suited to the forms of the one or more part(s) to be manufactured, such as a circular, oval or annular form, for example.

In order to produce a layer of powder on the work area 20, a dispensing device 32 delivers powder in the form of a bead onto the upper surface S28 of a movable element 28, then the scraper and/or the one or more roller(s) of the powder spreading device spread the powder deposited in the form of a bead over the work area 20. In order to produce a bead of powder on the upper surface S28 of a movable element 28, this movable element 28 translationally moves under a powder dispensing device 32.

As illustrated in FIG. 2, a powder dispensing device 32 comprises a buffer tank 40 connected to a powder supply 42, and a powder dispensing point P1, below which a movable element 28 moves. The powder supply 42 assumes, for example, the form of a valve 43, to which a container 45 is detachably connected. The container 45 contains the powder intended to feed the buffer tank 40 of a dispensing device 32 during a manufacturing cycle. The valve 43 allows the passage of powder towards a powder dispensing device 32 to be permitted or prevented. Alternatively, the powder supply 42 can also assume the form of an automated powder supply circuit allowing, for example, powder to be supplied to a plurality of additive manufacturing machines.

As illustrated in FIG. 2, the buffer tank 40 of a powder dispensing device 32 is connected to a powder supply 42, and notably to the valve 43, by a pipe 46. In the event that the machine 10 comprises two powder dispensing devices 32 provided on either side of the same work area, these two powder dispensing devices 32 are connected, for example, to the same powder supply 42, and therefore to the same valve 43.

A powder dispensing device 32 allows a stable and controlled flow of powder to be delivered to a dispensing point P1, under which a movable element 28 moves. In greater detail, the outlet 58 of the dispensing device 32 corresponds to the powder dispensing point P1. As illustrated in FIG. 3, a powder dispensing device 32 is mounted, for example, above the sheath 39.

Figure 4:
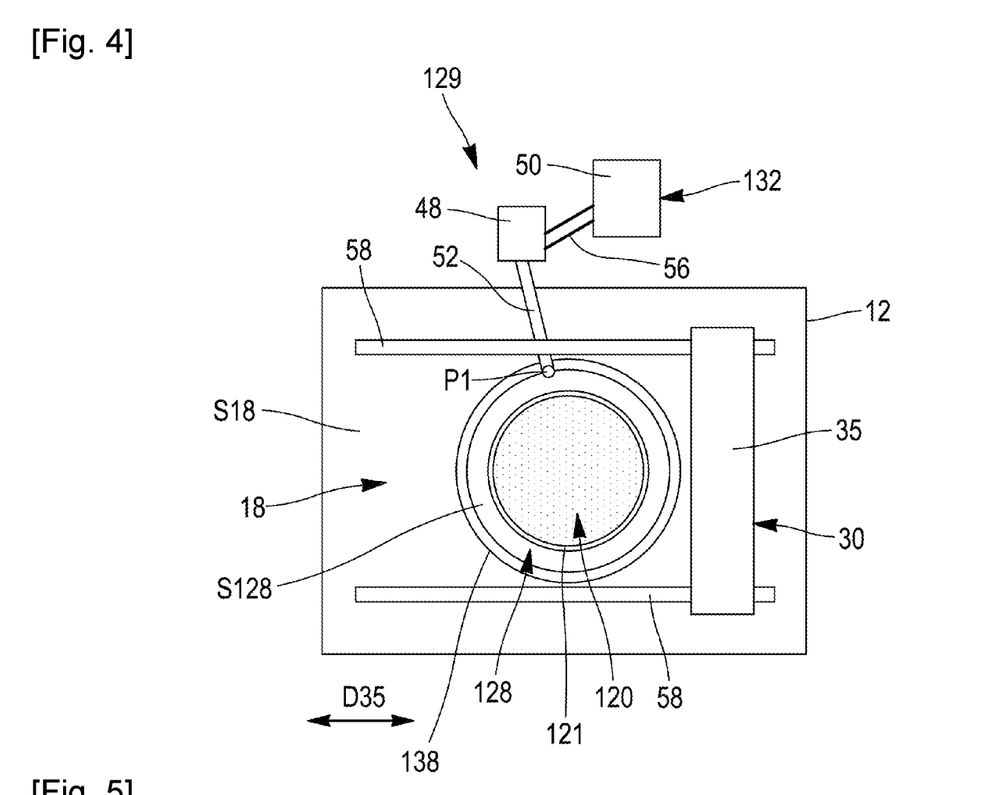
FIG. 4 is a schematic top view of a second variant of an additive manufacturing machine that can be improved with the invention.

In a second variant of the machine according to the invention illustrated in FIG. 4, the device 129 for depositing a layer of powder comprises a movable element 128 for receiving powder surrounding the work area 120, a device 132 for dispensing a bead of powder onto the movable element 128 and a device 30 for spreading powder deposited onto the movable element 128.

In this second variant, the work area 120 is circular. The opening 121 provided in the work top 18 and defining this work area is also circular.

For example, the movable element 128 externally surrounds the work area 120 over its entire circumference. The movable element 128 assumes the form of a ring and the upper surface S128 of the movable element is annular. The movable element 128 moves in the vicinity of the work area 120 in a receptacle 138 provided in the work top 18. This receptacle 138 assumes, for example, the form of an annular recess produced in the work top 18 around the work area 120.

In greater detail, the movable element 128 rotates around the work area 120. The movable element is set into rotation around the work area 120 by at least one actuator, such as a motor (not shown). The movable element is set into rotation around a vertical axis. By being mounted to freely rotate around the work area 120 and by having an annular form, the movable element 28 occupies a very small amount of space around the work area 120.

In this second variant, the device 32 for dispensing a bead of powder onto the upper surface S128 of the movable element 128 comprises a buffer tank 48 connected to a powder supply 50 and a dispensing pipe 52 connecting the buffer tank 48 to a powder dispensing point P1 located above the movable element 128. The dispensing pipe 52 is mounted, for example, on a vibrating device (not shown), so as to generate a continuous flow of powder in the dispensing pipe and the buffer tank 48 towards the powder dispensing point P1. The buffer tank 48 can be rigidly fixed to the dispensing pipe 52. The buffer tank 48 is fixed to an upstream end of the dispensing pipe 52, and the powder dispensing point P1 is located at the other downstream end of the dispensing pipe. The buffer tank 48 is connected, for example, to the powder supply by a flexible pipe 56. The powder supply 50 can be connected to an automated powder supply circuit or can assume the form of a detachable container.

In this second variant, the spreading device 30 also assumes the form of a scraper and/or of one or more roller(s) mounted on a carriage 35. This carriage 35 is mounted to translationally move in a longitudinal horizontal direction D35 above the work area 120. In order to be guided for longitudinal horizontal movement, the carriage 35 can be mounted on rails 58.

In any of the previously described variants, the upper surface S28, S128 of a movable element 28, 128 moves under a powder dispensing device 32, 132 and in the vicinity of a work area 20, 120. During these movements, the movable element 28, 128 can experience vibrations and jarring that is likely to cause a certain amount of powder to fall off the slide.

In order to prevent, or at least limit, the amount of powder falling from the upper surface S28, S128 of a movable element 28, 128 during a movement of this movable element 28, 128, at least part of the upper surface S28, S128 of the movable element is located above the upper surface of the work top and/or at least part of the upper surface S28, S128 of the movable element is located below the upper surface of the work top.

In other words, one or more part(s) of the upper surface S28, S128 of the movable element is/are located above the upper surface S18 of the work top, one or more part(s) of the upper surface S28, S128 of the movable element is/are located below the upper surface S18 of the work top, or one or more of the first part(s) of the upper surface S28, S128 of the movable element is/are located above the upper surface S18 of the work top and one or more of the second part(s) of the upper surface S28, S128 of the movable element is/are located below the upper surface S18 of the work top.

By increasing the roughness of the upper surface S28, S128 of the movable element and/or by increasing the relative contact surface between the grains of powder and the upper surface of the movable element, the one or more part(s) of the upper surface of the movable element that are located above and/or below the upper surface of the work top allow the grains of powder to be better retained on the upper surface of the movable element, in particular during movements of this movable element.

Figure 5:
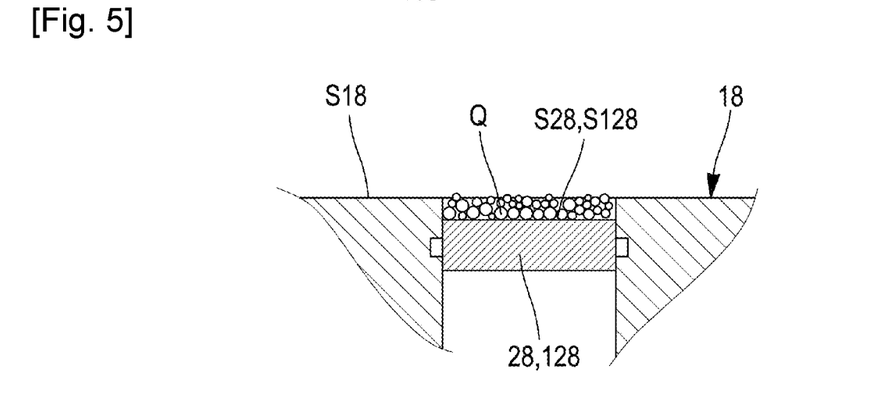
FIG. 5 is a schematic transverse section view of a first embodiment of the invention.

In a first embodiment of the invention illustrated in FIG. 5, the entire upper surface S28, S128 of a movable element 28, 128 can be located below the upper surface S18 of the work top 18. In this scenario, a residual amount Q of grains of powder is not carried by the powder spreading device 30 towards the work area 20, 120. This residual amount Q of grains of powder allows the relative contact surface to be increased with the new grains of powder that will be deposited onto the upper surface S28, S128 of a movable element 28, 128 by a dispensing device 32, 132. For example, the upper surface S28, S128 of the movable element 28, 128 is located between 60 micrometres and 5 millimetres, or between 100 micrometres and 1 millimetre, below the upper surface S18 of the work top 18.

As an alternative to this first embodiment, at least part of the upper surface S28, S128 of a movable element is located in the extension of the upper surface of the work top, and the movable element also comprises at least one raised form 60 rising above its upper surface and/or at least one recessed form 62 extending below its upper surface.

Figure 6:
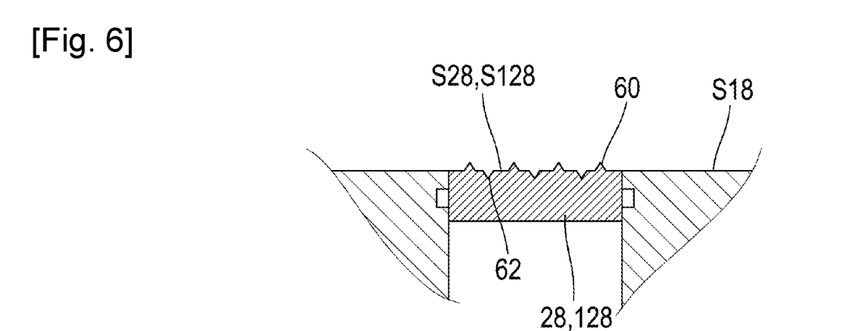
FIGS. 6, 7 and 8 are schematic transverse section views of various variants of an alternative embodiment of the invention.

As illustrated in FIG. 6, a movable element can comprise raised forms 60 rising above its upper surface and recessed forms 62 extending below its upper surface.

Figure 7:
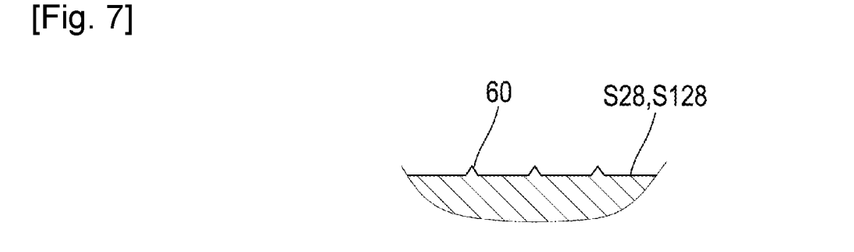

As illustrated in FIG. 7, a movable element can only comprise raised forms 60 rising above its upper surface.

Figure 8:
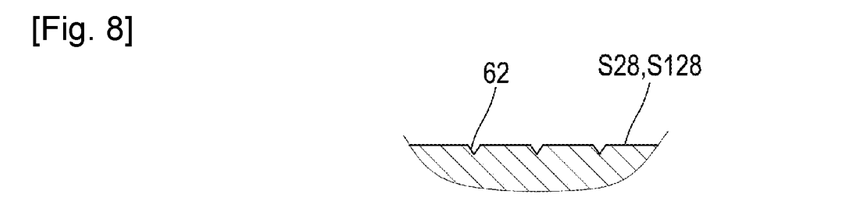

As illustrated in FIG. 8, a movable element can comprise only recessed forms 62 extending below its upper surface.

The raised forms 60 and the recessed forms 62 can be obtained by laser machining, for example. The raised forms can be printed, for example, onto the upper surface of the movable element, for example, with an additive manufacturing method. The recessed forms 62 are machined, for example, i.e. obtained by removing material, in the upper surface of the movable element.

The raised forms 60 and/or the recessed forms 62 allow the relative contact surface to be increased with the new grains of powder that will be deposited onto the upper surface S28, S128 of a movable element 28, 128 by a dispensing device 32, 132.

In order to further increase the retention of the grains of powder on the upper surface of the movable element, a raised form 60 or a recessed form 62 is made up of a plurality of elementary patterns M. A pattern M can have an open or closed profile, and this profile can assume various forms: circular, triangular, polygonal, etc.

Figure 9:
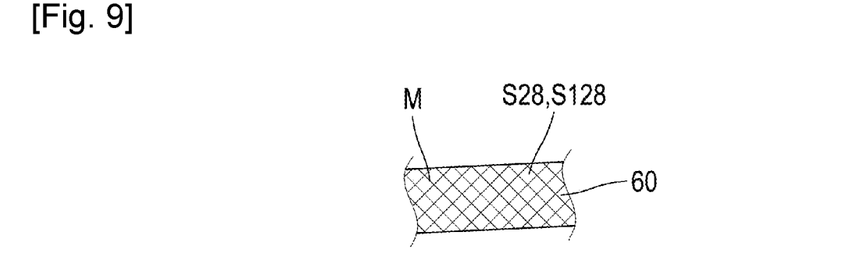
FIGS. 9, 10 and 11 illustrate various patterns that can be used in the alternative embodiment of the invention of FIGS. 6, 7 and 8.

In a first example illustrated in FIG. 9, the elementary patterns M are joined together.

Figure 10:
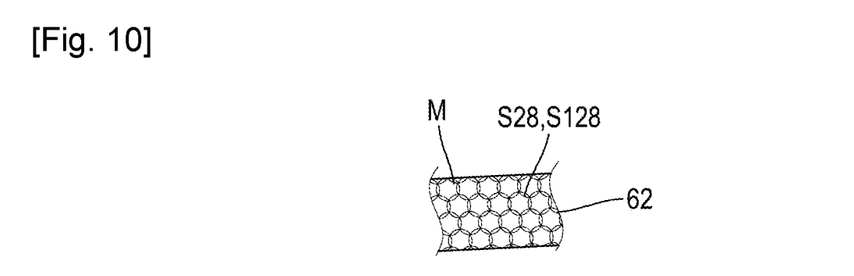

In another example illustrated in FIG. 10, the patterns M are intersecting.

Figure 11:
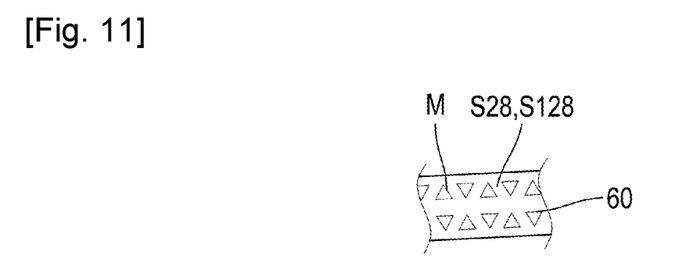

In another example illustrated in FIG. 11, the patterns M are adjacent without intersection.

Optionally, one or more of the raised form(s) and/or one or more of the recessed form(s) can be provided on the upper surface S28, S128 of a movable element 28, 128 that is located below the upper surface S18 of the work top 18.

In one embodiment illustrated in FIGS. 12 to 15, a single recessed form 64 is provided in the upper surface S28, S128 of the movable element.

Figure 12:
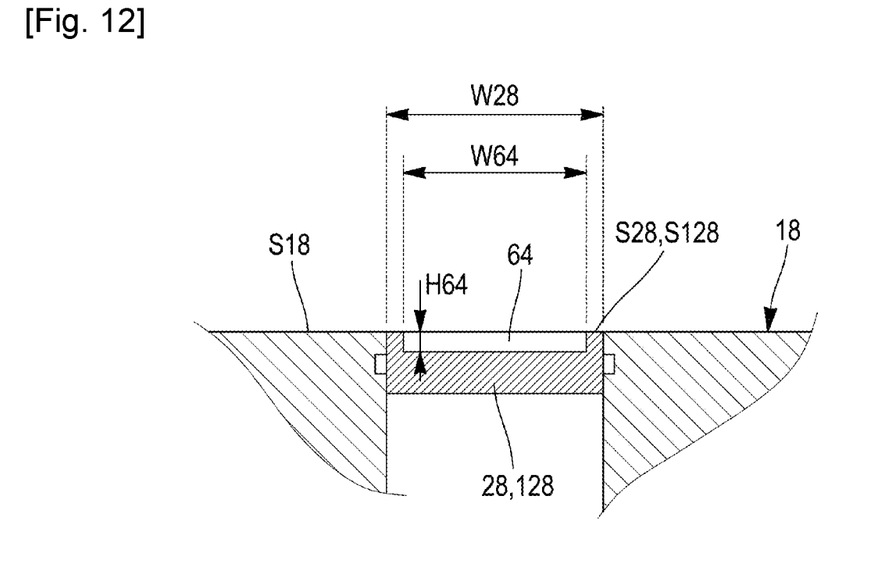
FIG. 12 is a schematic transverse section view of another embodiment of the invention.

For example, the single recessed form 64 provided in the upper surface of the movable element assumes the form of a rectangular section recess in a vertical plane and assumes a height H64 in a vertical direction ranging between 60 micrometres and 5 millimetres, or between 150 micrometres and 2 millimetres.

In order to maximize the increase in the relative contact surface with the new grains of powder deposited by a dispensing device, the single recessed form 64 extends over a width W64 at least equal to 80% of the width W28 of the upper surface of the movable element.

Figure 13:
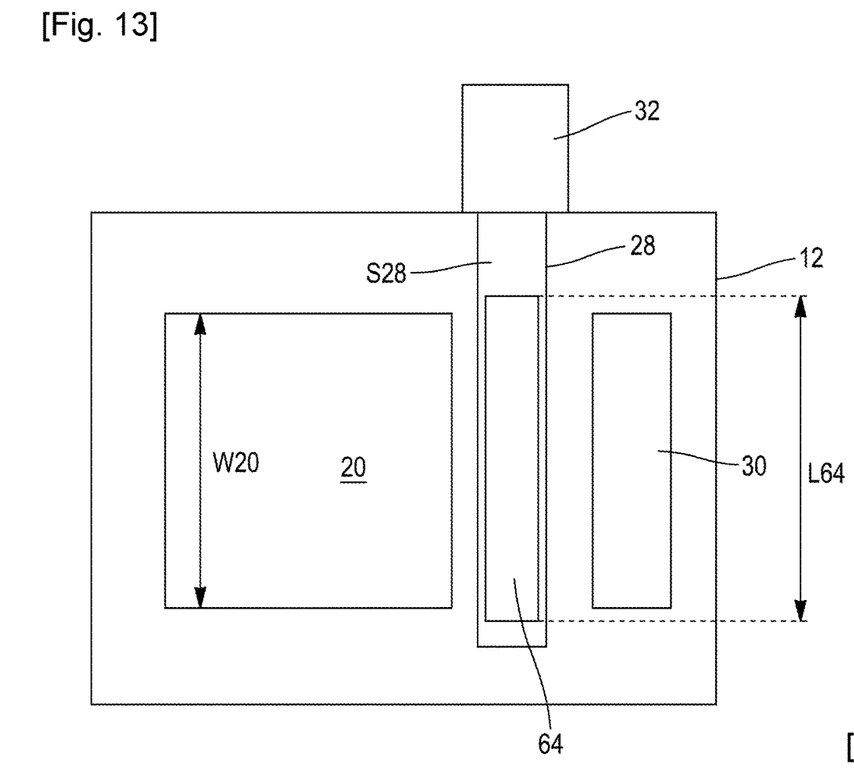
FIG. 13 is a schematic top view of the embodiment of the invention of FIG. 12.

Particularly in the case where the movable element 28 assumes the form of a slide, and as illustrated in FIG. 13, the single recessed form 64 extends lengthwise over a distance that is greater than the largest transverse dimension of the work area. In the case where the work area is parallelepiped and where the movable element 28 also assumes a parallelepiped form, the single recessed form 64 extends over a length L64 that is greater than the width W20 of the work area. This thus ensures the quality of the powder bed deposited onto the longitudinal edges of the work area.

Figure 14:
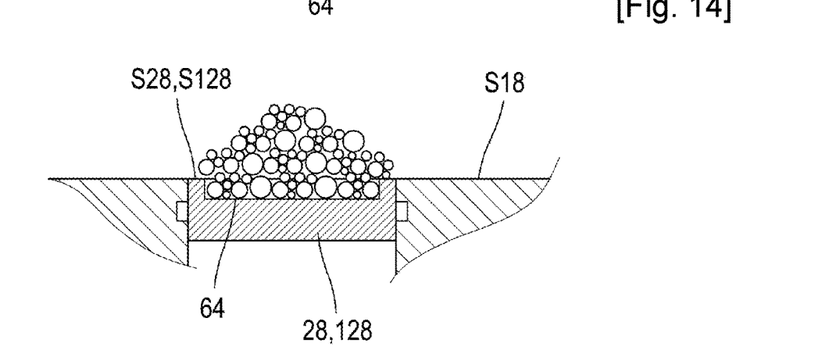
FIGS. 14 and 15 illustrate the operating principle of the invention in the embodiment of FIGS. 12 and 13.
Figure 15:
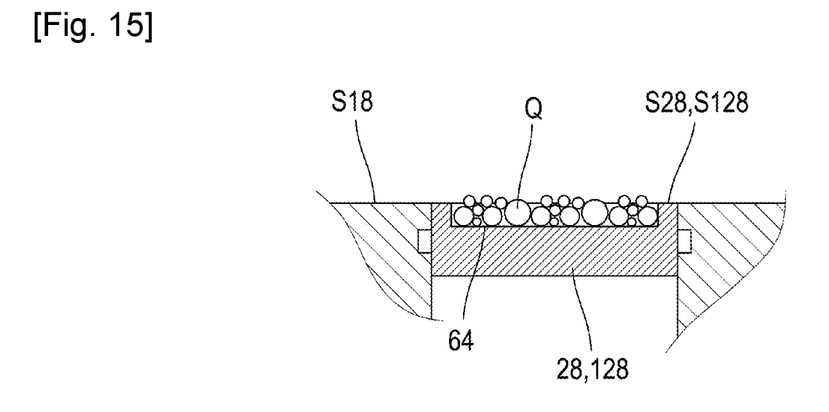

FIGS. 14 and 15 illustrate the implementation of the invention with the single recessed form 64 that has just been described. In a first step, illustrated in FIG. 14, a bead C of powder is deposited by a dispensing device 32, 132 onto the movable element 28, 128. If no layer of powder has been produced beforehand, the recessed form 64 is also filled with powder by the dispensing device 32, 132 during this first step. In order to deposit the bead C of powder, the movable element 28, 128 moves, for example, below the dispensing device 32, 132.

Once the bead C of powder is deposited and the movable element 28, 128 is positioned between the spreading device 30 and the work area 20, 120, the spreading device is set into motion so as to spread the bead of powder towards the work area.

After the spreading device 30 passes above the movable element 28, 128, a residual amount Q of grains of powder is still present in the recessed form 64. This residual amount Q of grains of powder allows the relative contact surface to be increased with the new grains of powder that will be deposited onto the upper surface S28, S128 of the movable element 28, 128 by a dispensing device 32, 132.

The invention claimed is:

1. A machine for additive manufacturing by powder bed deposition, the machine comprising:
- a work top;
- a work area;
- a device for depositing a layer of powder onto the work area; and
- a heat or energy source used to selectively consolidate a layer of powder deposited onto the work area,
- wherein the device for depositing a layer of powder comprises a movable element for receiving powder moving relative to the work top and in a vicinity of the work area, a device for dispensing a bead of powder onto the movable element and a device for spreading the bead of powder from the movable element toward the work area,
- wherein the movable element is in a form of a slide mounted to translationally move in a transverse horizontal direction relative to the work area and moving between a retracted position, in which the slide is located outside a trajectory of the powder spreading device, and a deployed position, in which the slide at least partly extends into the trajectory of the powder spreading device or the movable element externally surrounds the work area over an entire circumference of the work area and rotationally moves around the work area,
- wherein at least part of the upper surface of the movable element is located in an extension of the upper surface of the work top, and
- wherein the movable element is provided with a single recessed form extending below the upper surface of the movable element, and
- wherein the single recessed form is in a form of a rectangular section recess in a vertical plane, has a uniform depth in a vertical direction ranging between 60 micrometers and 5 millimeters, extends over a width at least equal to 80% of a width of the upper surface of the movable element, and extends lengthwise over a distance that is greater than a largest transverse dimension of the work area.

2. The machine for additive manufacturing by powder bed deposition according to claim 1, wherein the entire upper surface of the movable element is located below the upper surface of the work top.

3. The machine for additive manufacturing by powder bed deposition according to claim 2, wherein the upper surface of the movable element is located between 60 micrometers and 5 millimeters below the upper surface of the work top.

4. The machine for additive manufacturing by powder bed deposition according to claim 1, wherein the movable element moves in the vicinity of the work area in a receptacle provided in the work top.

5. The machine for additive manufacturing by powder bed deposition according to claim 1, wherein, with the device for dispensing a bead of powder being fixed, the movable element moves under the dispensing device.

* * * * *